United States Patent [19]
Bennett et al.

[11] Patent Number: 6,052,698
[45] Date of Patent: Apr. 18, 2000

[54] REORGANIZATION OF COLLISIONS IN A HASH BUCKET OF A HASH TABLE TO IMPROVE SYSTEM PERFORMANCE

[75] Inventors: John G. Bennett; Raja Krishnaswamy, both of Bellevue, Wash.

[73] Assignee: Microsoft Corporation, Redmond, Wash.

[21] Appl. No.: 09/270,902

[22] Filed: Mar. 15, 1999

Related U.S. Application Data

[63] Continuation of application No. 08/772,334, Dec. 23, 1996.

[51] Int. Cl.[7] .................................................. G06F 17/30
[52] U.S. Cl. ........................... 707/205; 707/100; 711/119
[58] Field of Search ................................... 707/1–2, 3, 4, 707/200–206, 100, 101; 711/113, 118, 119, 133, 216

[56] References Cited

U.S. PATENT DOCUMENTS

| | | | |
|---|---|---|---|
| 4,638,426 | 1/1987 | Chang et al. | 364/200 |
| 5,197,002 | 3/1993 | Spencer | 364/406 |
| 5,339,398 | 8/1994 | Shah et al. | 395/400 |
| 5,493,660 | 2/1996 | DeLano et al. | 395/416 |
| 5,600,816 | 2/1997 | Oldfield et al. | 395/440 |
| 5,778,430 | 7/1998 | Ish et al. | 711/133 |

OTHER PUBLICATIONS

Stubbs et al., Data Structures with Abstract Data Types and Pascal, Brooks/Cole Publishing Company, California, 1985, pp. 310–336.

Panneerselvam et al., "Reconfigurable Systolic Architectures for Hashing," PARBASE, 1990, p. 543.

Anderson and Shanley, Pentium Processor System Architecture, Second Edition, Addison–Wesley, Massachuetts, 1995 pp. 35–60.

Knuth, Donald E., The Art of Computer Programming, "Sorting and Searching," Addison–Wesley, Massachusetts, 1973, pp. 393–405 and 506–549.

Teuhola, Jakka, "Effective Clustering of Objects Stored by Linear Hashing," CIKM '95, Maryland, 1995, pp. 274–280.

Williams, J.G., "Storage Utilization in a Memory Hierarchy when Storage Assignment is Performed by a Hashing Algorithm," Communications of the ACM, Mar. 1971, USA, vol. 14, No. 3, pp. 172–175.

"Minimizing Locking to Access Global Shared Data," IBM Technical Disclosure Bulletin, vol. 38, No. 2, Feb. 1995, pp. 619–622.

*Primary Examiner*—Hosain T. Alam
*Attorney, Agent, or Firm*—Schwegman, Lundberg, Woessner & Kluth, P.A.

[57] ABSTRACT

An improved hashing system is provided that takes advantage of the caching architecture of many of today's processors to improve performance. Some of today's most advanced processors, like PENTIUM processor, have a two level caching scheme utilizing a primary cache and a secondary cache, where data contained in the primary cache is accessible 50–150 times faster than data in main memory. The improved hashing system ensures that collision occur so that the buckets contain many entries, and at runtime, the entries in the buckets are reordered to increase the number of times that the primary cache of the processor is used and to reduce the number of times that main memory is used, thereby improving the performance of the hashing system.

10 Claims, 12 Drawing Sheets

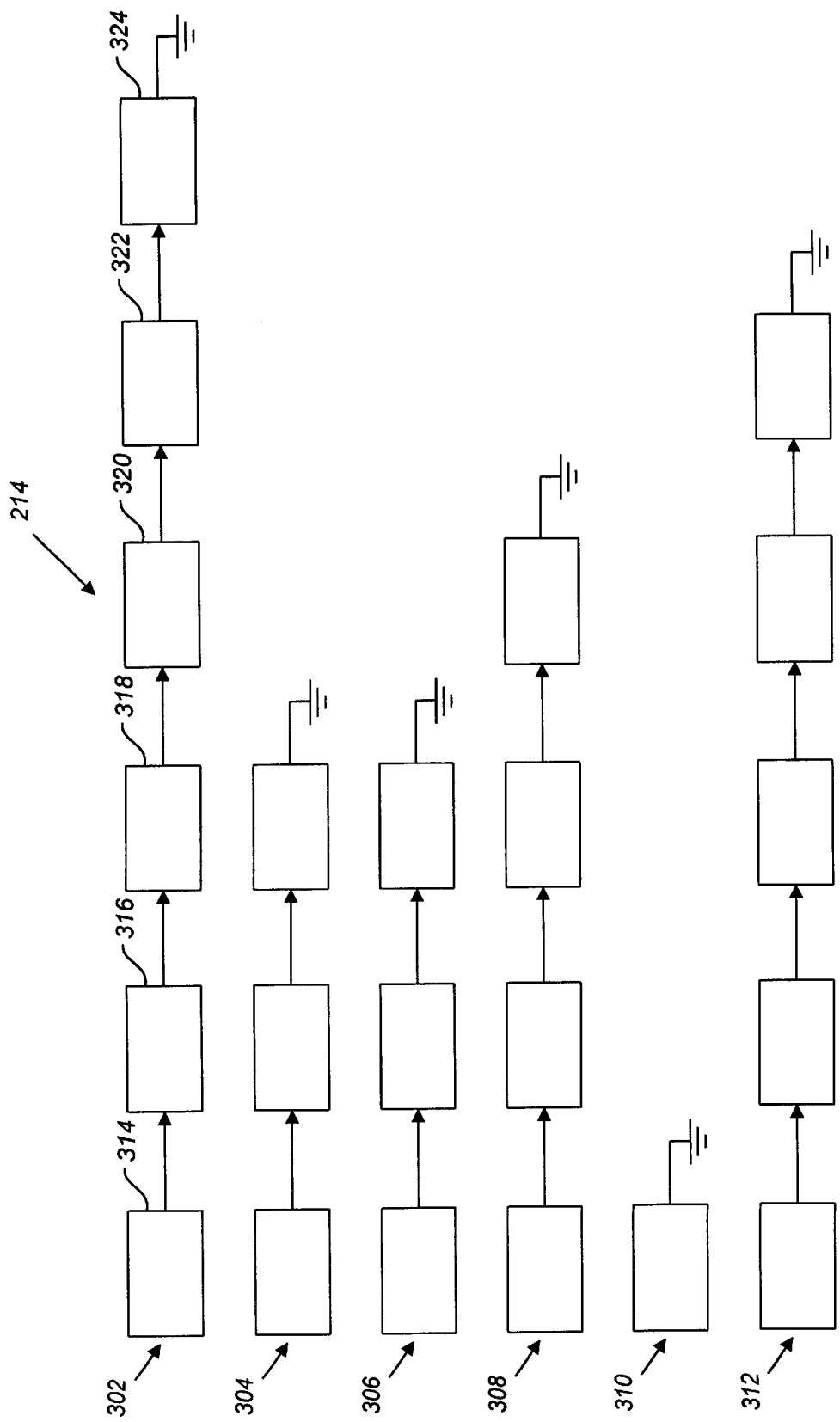

2

REORGANIZATION OF COLLISIONS IN A HASH BUCKET OF A HASH TABLE TO IMPROVE SYSTEM PERFORMANCE

CROSS-REFERENCE TO RELATED APPLICATION

This application is a continuation of U.S. patent application Ser. No. 08/772,334, filed Dec. 23, 1996, now pending.

TECHNICAL FIELD

The present invention relates generally to data processing systems and, more particularly, to reorganizing collisions in a hash bucket of a hash table.

BACKGROUND OF THE INVENTION

As processors have become faster, main memory access has become the bottleneck to overall increased performance. Therefore, in order to improve performance, memory caching schemes have been adopted to lessen the effect of the main memory bottleneck. The PENTIUM processor employs one such memory caching scheme that uses a very fast primary cache and a fast secondary cache. When the processor needs to read data from memory, the processor first checks the primary cache to locate the data. If the requested data is not found in the primary cache, then the secondary cache is checked, which has a slower access time than the primary cache, but is still much faster than main memory. If the data is located in the secondary cache, the data is returned to the processor and the line ("cache line") of the secondary cache that stored the data is copied into the primary cache. Data is stored in both the primary cache and the secondary cache in terms of 32-byte cache lines. The primary cache is 8 KB in size, so it can store 256 cache lines. The secondary cache is typically 256 KB to 512 KB, so it can store between 8,192 to 16,384 cache lines.

If after checking the secondary cache the data is still not found, main memory is accessed which has a significantly slower access time than the secondary cache. When main memory is accessed, not only the requested data, but an entire memory line of 32bytes is returned. The processor receives the requested data, and both the primary and secondary caches receive the entire 32-byte memory line. The 32-byte memory line is stored in the caches in the hope that the next time the processor needs to read data from memory, the data will be found within this cache line. To put the costs in perspective, it takes 1 processor cycle to access the primary cache, 4–12 processor cycles to access the secondary cache, and typically 50 processor cycles to access main memory. Therefore, the primary cache could be searched perhaps 50 times in the time that it takes to access main memory once. The PENTIUM processor's caching scheme is described in greater detail in Anderson and Shanley, *Pentium Processor System Architecture*, at 35–60, 2$^{nd}$ ed., Addison-Wesley (1995), which is hereby incorporated by reference.

Hashing mechanisms play an important role in many computer systems. Conventional hashing mechanisms utilize a data structure known as a hash table to provide direct access to stored data. One such example of a conventional hashing mechanism 100 is depicted in FIG. 1. The hashing mechanism 100 comprises a key 102, a hash function 104, a hash index 106, and a hash table 108. The hash table 108 contains a number of hash buckets 110–130, and each hash bucket contains data, such as a record, with one of the fields of the record acting as the key 102. In order to access the hash table 108, the key 102 is input into a hash function 104 which yields an index 106 (or hash address) that refers to a specific hash bucket (e.g, 114). Within the hash bucket 114 is the data that matches the key. Hash tables are useful because they provide direct access to data by mapping a large range of key values into a smaller range of indexes. In this manner, for example, if a key of eight digits were utilized having a range of key values from 0 to 99,999,999 and if less than ten values are ever used, a hashing mechanism can be used to hash the key into an index of one digit to refer to a hash table containing ten buckets. Therefore, instead of using a hash table having one-hundred-million hash buckets where only a very limited number of the buckets are ever used, a hash table of only ten buckets can be used to more efficiently use system resources, but still provide direct access to the data.

The function "h" 104 maps each key value onto exactly one index, and therefore, whenever the same key value is used more than once, the same index 106 into the hash table 108 is generated. Sometimes, however, when attempting to store data in the hash table 108, more than one key value will hash to the same index 106. In this situation, a "collision" has occurred. When a collision occurs, the data must be stored in the hash bucket indicated by the index and therefore more than one record will be stored in this hash bucket. Hash bucket 118 depicts the state of a hash bucket after a collision has occurred and more than one record is stored in the hash bucket. In hash bucket 118, one record of data "data3" is linked to a second record of data "data4." As more collisions occur, the hash buckets become more populated and thus the benefits of a hash table start to diminish because each record within the hash bucket is no longer directly accessible. Instead, after hashing the key value into an index, the index refers to a hash bucket that contains a number of records linked together and the hash bucket must then be searched to determine the correct record, which is costly in terms of processing time. Therefore, conventional hashing systems are designed to avoid collisions.

Because a hash table provides direct access to the data that it stores, hash tables are an important part of many existing computer systems. It is thus desirable to improve the performance of hash mechanisms. However, conventional hash mechanisms have failed to take advantage of the caching architecture of today's processors.

SUMMARY OF THE INVENTION

An improved hashing system is provided that takes advantage of the caching architecture of many of today's processors to improve performance. Some of today's most advanced processors, like the PENTIUM processor, have a two-level caching scheme utilizing a primary cache and a secondary cache, where data contained in the primary cache is accessible 50–150 times faster than data in main memory. The improved hashing system ensures that collisions occur so that the buckets contain many entries, and at runtime, the entries in the buckets are reordered to increase the number of times that the primary cache of the processor is used and to reduce the number of times that main memory is used, thereby improving the performance of the hashing system.

In accordance with a first aspect of the present invention, a method is provided in a computer system for accessing data in a hash table having buckets containing entries. A plurality of the entries are occupied entries containing data. The method creates a hash mechanism that receives requests to input data into the hash table and that generates collisions such that a plurality of occupied entries are contained in each bucket, and the method receives a plurality of requests for accessing the hash table by the hash mechanism. While the hash mechanism processes the plurality of requests for accessing the hash table, the method relocates the data in at least one of the occupied entries of at least one of the buckets to a new location among the occupied entries in at least one bucket to improve performance of the hash mechanism.

In accordance with a second aspect of the present invention, a computer system is provided comprising a memory, a processor and a cache having cache lines with a size. The memory contains a hash manager and a hash table having chains of buckets. Each bucket contains entries storing data and each bucket is the cache line size. The hash manager receives a request to access the data in the hash table, accesses the data in the hash table, and positions most recently used data in a first bucket of each chain after the chain has been accessed. The processor runs the hash manager.

In accordance with a third aspect of the present invention, a method is provided in a computer system having a memory with pages for accessing data. The method creates a hash table having chains of buckets with each bucket having a plurality of entries storing the data. The bucket in each chain forms a sequence from a first bucket to a last bucket. Each bucket has a position relative to the sequence. The method further stores the buckets of the chains having an equivalent relative position in the sequence into a single page of the memory.

BRIEF DESCRIPTION OF THE DRAWINGS

FIG. 3 depicts a more detailed diagram of the hash table depicted in FIG. 2.

DETAILED DESCRIPTION OF THE INVENTION

Figure 1:
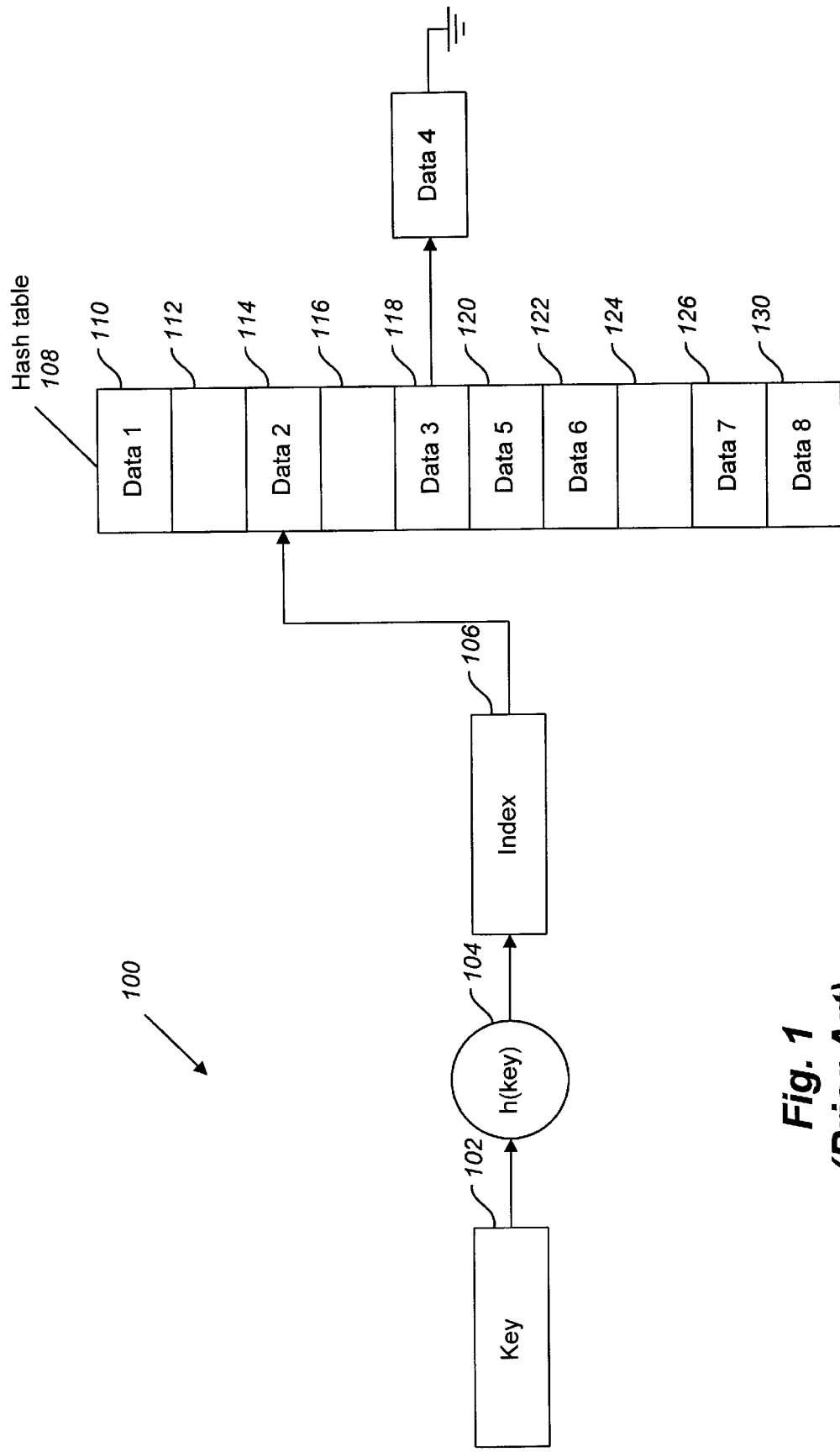
FIG. 1 depicts a conventional hashing mechanism.

A preferred embodiment of the present invention provides an improved hashing system that takes advantage of the caching architecture of many of today's processors to improve performance. Some of today's most advanced processors, like the PENTIUM processor, have a two-level caching scheme utilizing a primary cache and a secondary cache, where data contained in the primary cache is accessible 50–150 times faster than data in main memory. The improved hashing system ensures that collisions occur so that the buckets contain many records, and at runtime, the records in the buckets are reordered to increase the number of times that the primary cache of the processor is used and to reduce the number of times that main memory is used, thereby improving the performance of the hashing system.
Overview The improved hashing system maintains a hash table with a number of hash buckets. Each hash bucket is actually a chain of "buckets" that are each 32bytes in length (an entire line of memory or cache line). Each bucket has a number of entries, with each entry storing one record. The improved hashing system takes advantage of the following principle to improve performance. Since the entries in the chain of buckets are searched linearly to find a requested record, whenever a requested record is found in the chain, each entry in each bucket before it had to have been accessed to determine if it stored the requested record. As each entry in each bucket is accessed, its corresponding memory line is brought into the primary cache regardless of where it was originally located. Thus, when a requested record is found, virtually all of the preceding buckets (i.e., their corresponding cache lines) are ensured to be loaded in the primary cache. Therefore, an optimal reordering of the records can occur requiring little processing time, but will yield substantial performance benefits for subsequent accesses of the chain by increasing the number of primary cache hits and reducing the number of times that main memory is accessed.

After a requested record in a chain is located, the records in the entries are reordered so that the requested record appears in the first entry of the first bucket in the chain, with all other records being pushed back one entry. This technique assumes that the record most recently used will be accessed again soon. This technique populates the cache line of the first bucket with what is assumed to be the most frequently used records, which ensures that the cache line for the first bucket stays in the primary cache and that the use of the primary cache is increased while the use of main memory is decreased. This technique follows a most recently used (MRU) algorithm for inserting records into the first bucket and follows a least recently used (LRU) algorithm for taking records out of the first bucket. By putting the most recently used records of a chain in the first bucket, the first bucket stays within the primary cache and thus most accesses of the chain benefit from the reduced access time. There are a number of other algorithms that can be used instead of the MRU and LRU algorithms, some of which are discussed below.

As previously stated, the improved hashing system encourages collisions and reorders collisions to gain speed. Conventional hashing systems, however, attempt to avoid collisions. In such conventional hashing systems, collisions are tolerated only to prevent the hash table from growing too large. That is, a hash table with too few collisions will be sparse and have unused buckets.

Another aspect of the present invention organizes the buckets in the hash table into individual pages of memory so as to reduce the number of page faults that occur. For example, all of the first buckets in the chains of buckets are placed in the same page, thus ensuring that the page is virtually never swapped out of main memory, since the first buckets contain the most frequently used records. The second bucket in each chain is similarly stored in the same page and so on. Using this scheme, the most frequently used buckets will rarely be swapped out of memory which lessens the number of page faults. One alternative to this strategy is to store the last buckets of a chain after the first two or three buckets in a single page. Therefore, when an entry is accessed beyond the first two or three buckets, at most one page fault occurs, rather than a number of page faults being triggered by the searching of each subsequent bucket.

Implementation Details

Figure 2:
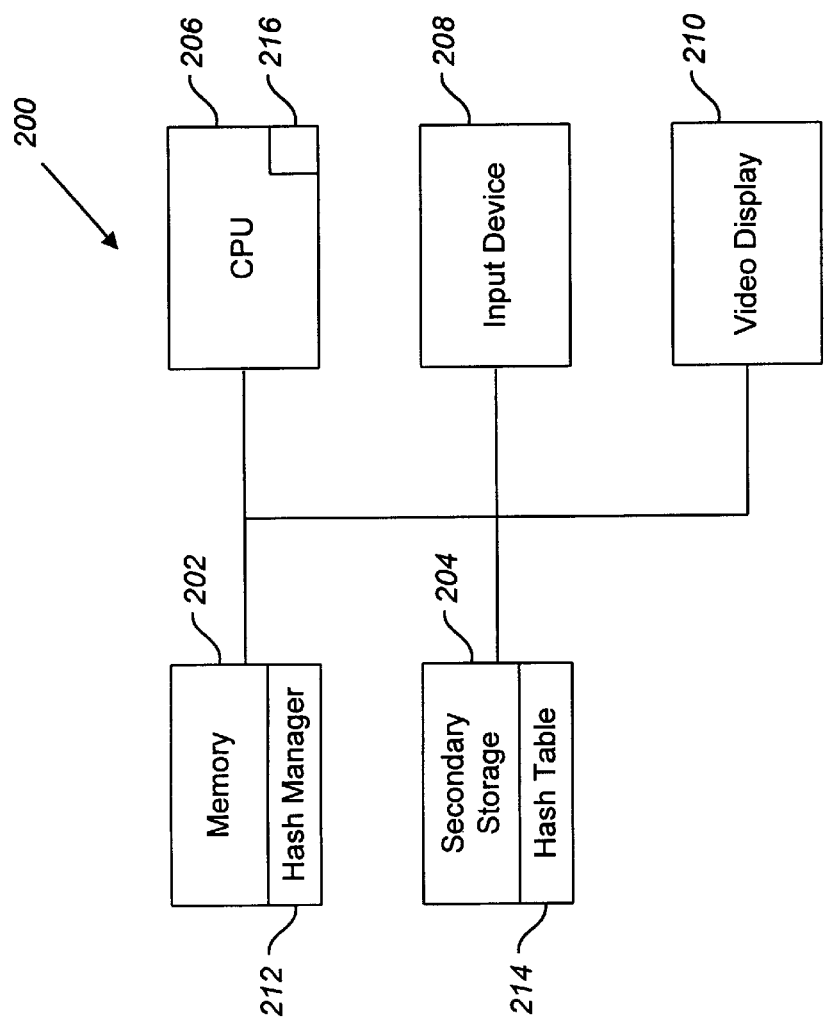
FIG. 2 depicts a computer system suitable for practicing a preferred embodiment of the present invention.

FIG. 2 depicts a computer system 200 that is suitable for practicing a preferred embodiment of the present invention. The computer system 200 contains a memory 202, a secondary storage device 204, a central processing unit (CPU) 206 such as the PENTIUM processor available from Intel Corporation of Santa Clara, CA, an input device 208, and a video display 210. The memory 202 contains a hash manager 212 that is responsible for manipulating the hash table 214 on the secondary storage device 204. Although the hash table 214 is depicted as residing on the secondary storage device 204, one skilled in the art will appreciate that at runtime the hash table is brought into memory 202 and is manipulated while in the memory. The CPU 206 contains a memory cache 216.

FIG. 3 depicts the hash table 214 in greater detail. The hash table 214 contains chains of buckets 302–312. Each of the chains 302–312 is a number of individual buckets (e.g., buckets 314–324) linked together. Each bucket contains a number of entries, with each entry containing data or a record.

Figure 4A:
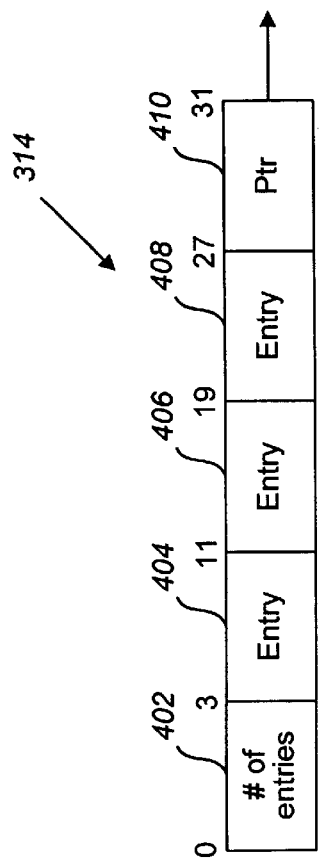
FIG. 4A depicts a more detailed diagram of a first bucket in the bucket chains depicted in FIG. 3.
Figure 4B:
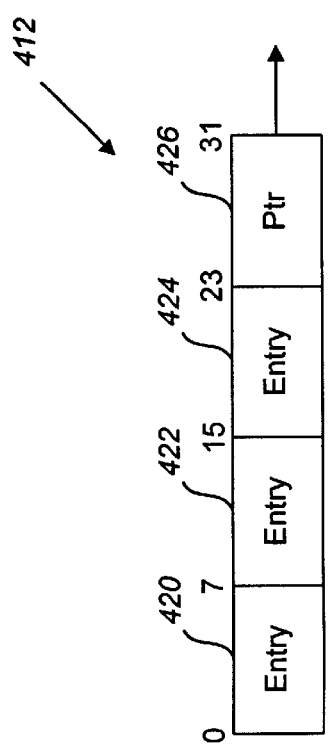
FIG. 4B depicts a more detailed diagram of the buckets that follow the first bucket in the bucket chains of FIG. 3.
Figure 4C:
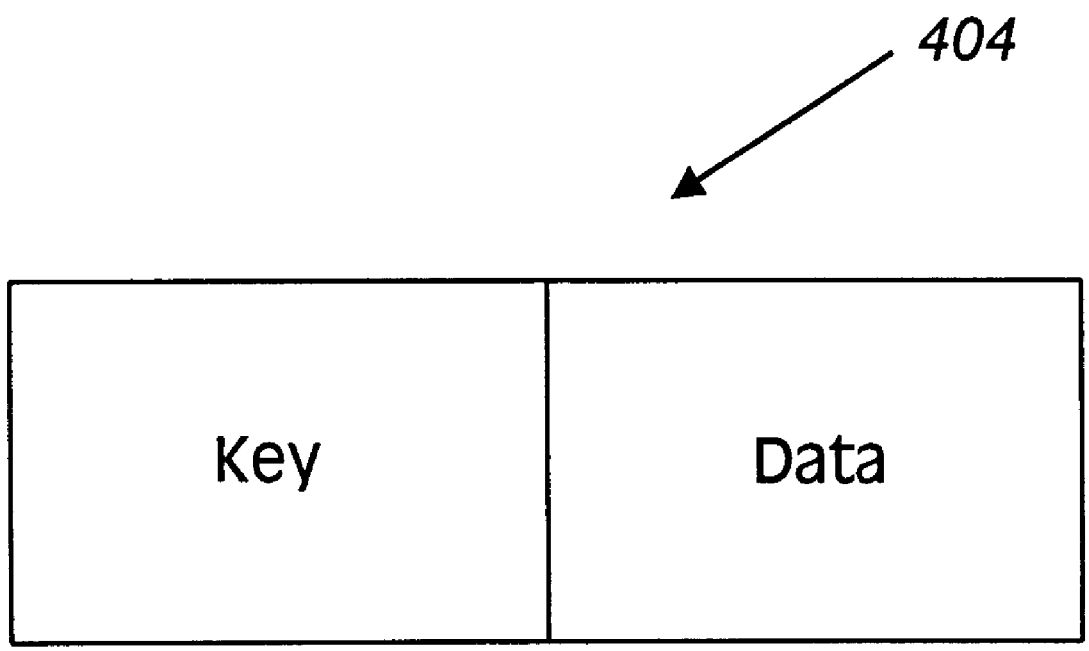
FIG. 4C depicts a more detailed diagram of an entry of FIG. 4A.

FIG. 4A depicts a more detailed diagram of the first bucket (e.g., 314) in each bucket chain 302–312. The bucket 314 is 32 bytes long to fit within one cache line and contains five fields: a number of entries field 402, which is 4 bytes and contains the number of entries in the entire chain of buckets; three entry fields 404, 406, and 408, which are each 8 bytes and which actually contain the records stored in the hash table; and a pointer 410, which is 4 bytes and refers to the next bucket in the chain of buckets. The entries 404, 406 and 408 have a format as depicted in FIG. 4C. The entry (e.g., 404) contains a key and data. However, one skilled in the art will appreciate that the key portion may contain a pointer to the key and the data portion may contain a pointer to the data. It should be appreciated that better performance is achieved by fitting more entries into a bucket. As such, it may be desirable to use a pointer to the data instead of storing the data itself if the data is large. Each subsequent bucket after the first bucket (e.g., 316–324) has a format as depicted in FIG. 4B. The bucket 412 is a total of 32 bytes long to correspond to the cache line size and contains three 8-byte data entries 420, 422, and 424 and an 8-byte pointer 426 to the next bucket in the chain of buckets (4 bytes of the pointer are typically unused).

Figure 5:
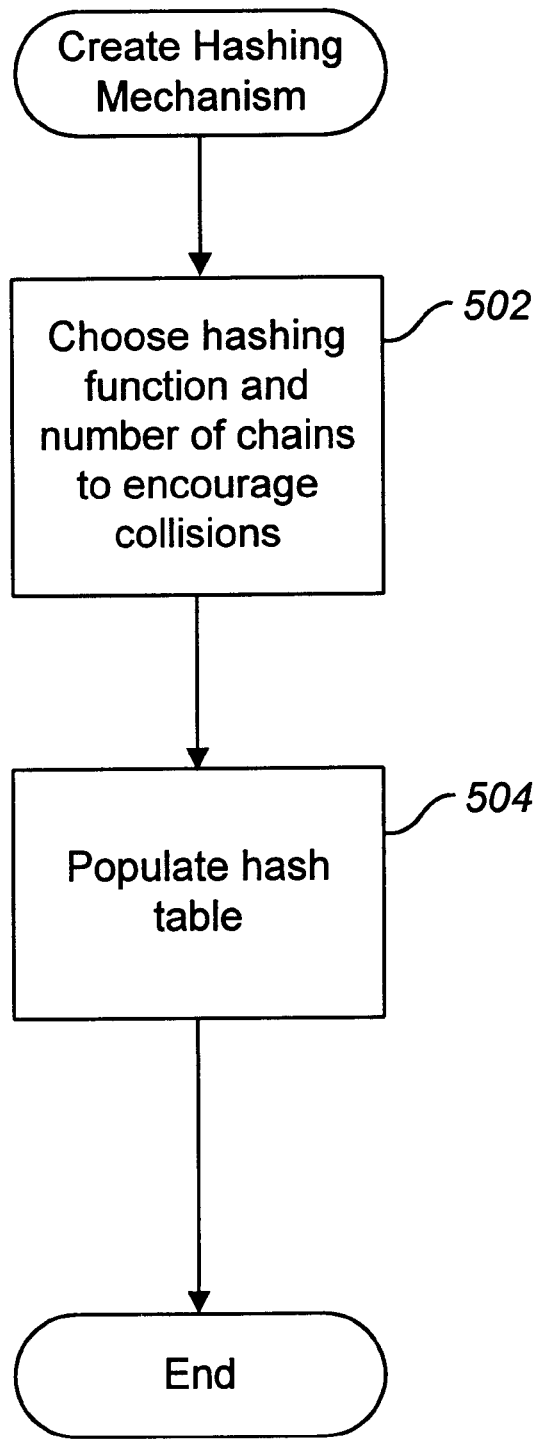
FIG. 5 depicts a flow chart of the steps performed in creating a hashing mechanism in accordance with a preferred embodiment of the present invention.

FIG. 5 depicts a flowchart of the steps performed in creating a hashing system in accordance with a preferred embodiment of the present invention. The first step performed in creating a hashing mechanism in accordance with a preferred embodiment is to choose a hashing function such that a limited number of indexes are generated to encourage collisions and to create a hash table having this number of chains (step 502). The hashing function chosen for use in the improved hashing system is selected to generate few enough indexes so as to create collisions, and the hash table 214 is configured with enough chains to accommodate the indexes generated by the hashing function. For example, if the key used for the hashing function were an eight digit number and there were approximately three thousand key values that would be in use at any particular time, if the hashing function were such that the last two digits of the key value were chosen as the hash index, there would be a mapping of three thousand keys onto only one hundred chains of buckets, and thus, on average, each chain of buckets would contain thirty entries. In this manner, the improved hashing mechanism is configured so as to encourage collisions. Therefore, in this step, the hashing function is chosen such that there is a large range of key values input into the hash function, but the hash function generates a very limited range of indexes into the hash table. The hash table is then implemented with this limited number of chains. After choosing the hash function and creating the hash table, the hash table is populated (in step 504). In this step, there may be data that needs to be added into the table before runtime (e.g., initial data). In this step, the index for each record is hashed to determine which chain of buckets the record belongs to and the record is added into the first entry in the first bucket in the chain of buckets. All subsequent records in subsequent entries in this chain are then pushed back one entry or position. It should be appreciated that this technique for adding records to the hash table is also used at runtime when records need to be added. One skilled in the art will appreciate that other methods for inserting a record into a bucket chain may be used.

Figure 6:
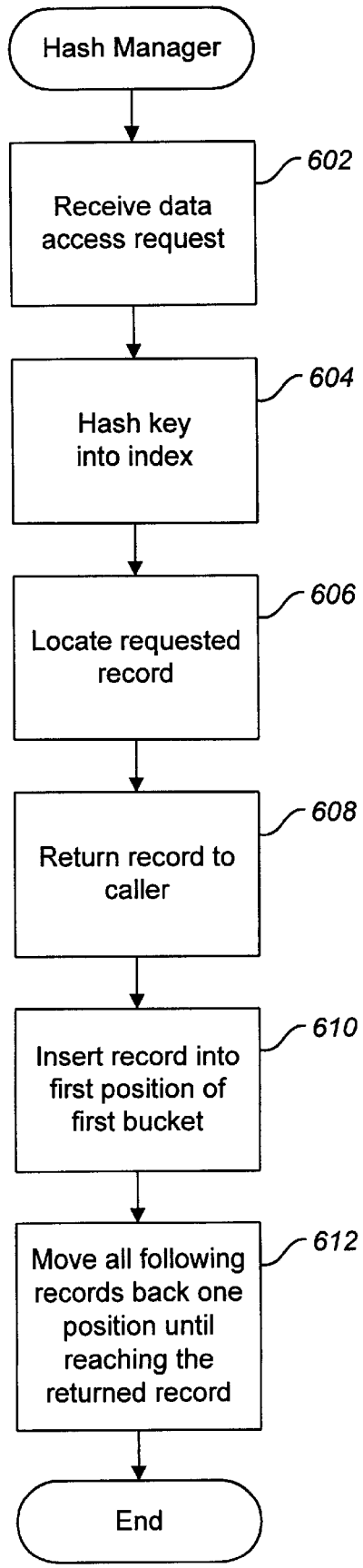
FIG. 6 depicts a flow chart of the steps performed by the hash manager when receiving a data access request.

FIG. 6 depicts a flowchart of the steps performed by the hash manager at runtime when receiving a request to access data. The first step performed by the hash manager is to receive a data access request (step 602). The data access request contains the key of the data. The hash manager then hashes the key into an index (step 604). In this step, the hash manager uses the hash functions to determine the index. After determining the index, the hash manager locates the requested record within the hash table by accessing the chain of buckets referred to by the index and linearly searching each entry in each bucket until finding the requested record matching the key (step 606). As previously stated, as each bucket in the chain is accessed, its corresponding cache line is brought into the primary cache by the processor. After locating the requested record, the hash manager returns the requested record to the caller (step 608). After returning the record to the caller, the hash manager reorders the records in the chain between the first entry in the first bucket and the entry where the requested record resided to improve system performance on subsequent accesses of this chain. At this point, the records to be reordered are stored in buckets whose cache lines are presently stored in the primary cache, thus the reordering uses nominal processing time. This reordering is performed in steps 610 and 612.

Figure 7:
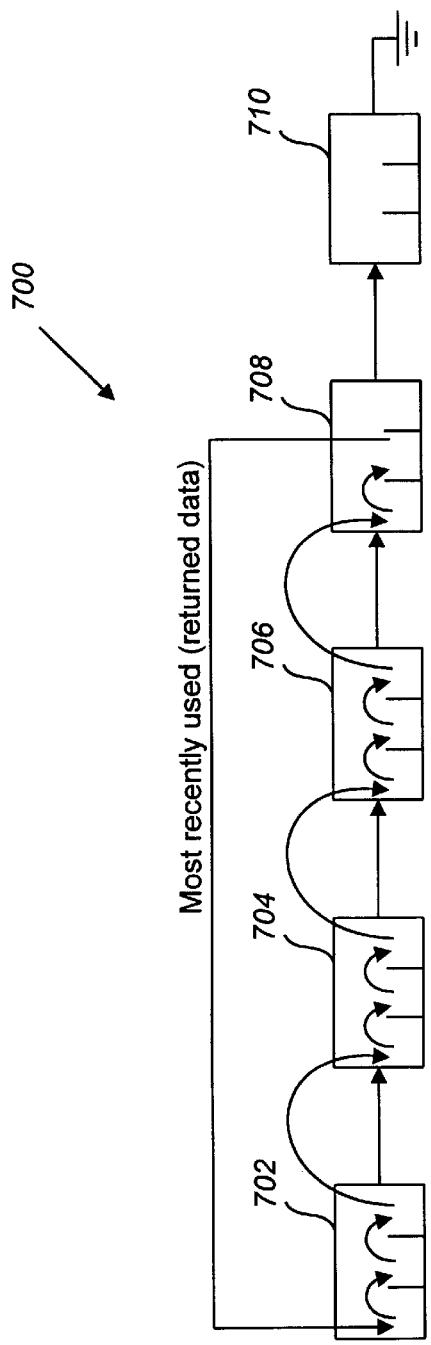
FIG. 7 depicts a bucket chain reordered in accordance with a preferred embodiment of the present invention.

The first step performed in reordering the records is for the hash manager to insert the requested record into the first entry of the first bucket (step 610). Then, the hash manager moves the record previously contained in that entry as well as the records contained in all entries following that entry, one entry backward until reaching the entry where the returned record was retrieved from (step 612). FIG. 7 depicts a bucket chain 700 that has been reordered in accordance with steps 610 and 612. The bucket chain 700 contains five buckets 702–710, with the returned record being retrieved from the second entry of bucket 708. As the record is retrieved from bucket 708, it is inserted into the first entry of bucket 702. Then, the record previously stored in the first entry of the first bucket 702, as well as all records in the following entries up to the first entry of bucket 708, are moved back one position and stored in the next entry. Therefore, as shown in FIG. 7, the hashing manager has performed both a most recently used algorithm for inserting data into the first bucket as well as performing a least recently used algorithm for taking data out of the first bucket.

Figure 8:
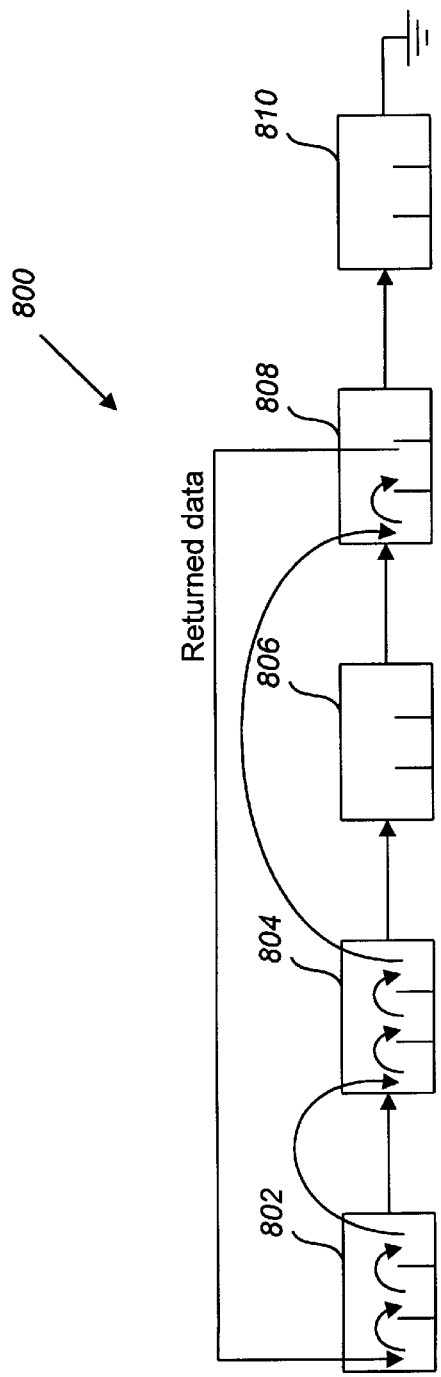
FIG. 8 depicts a bucket chain reordered in accordance with a first alternative embodiment of the present invention.

FIG. 8 depicts a first alternative embodiment for reorganizing the data in the bucket chain 800 after returning a requested record to the caller. In this system, a limited number ("n") of buckets is predetermined (e.g, n=2) and it is only this number of buckets that are reorganized after satisfying a data request. For example, the chain 800 comprises five buckets 802–810. Upon the retrieval of the record contained in the second entry of bucket 808, the returned record is inserted into the first entry of the first bucket 802. Buckets 802, 804, and 808 are then reorganized (but not bucket 806) by pushing each record back one entry with the record stored in the last entry of bucket 804 being inserted into the first entry of bucket 808. Reorganizing the chain of buckets in this manner reduces the amount of processing that must be performed in response to satisfying a data request, but still places the most recently used data into the first bucket so as to maximize the number of primary cache hits and minimize the number of primary cache misses.

Figure 9:
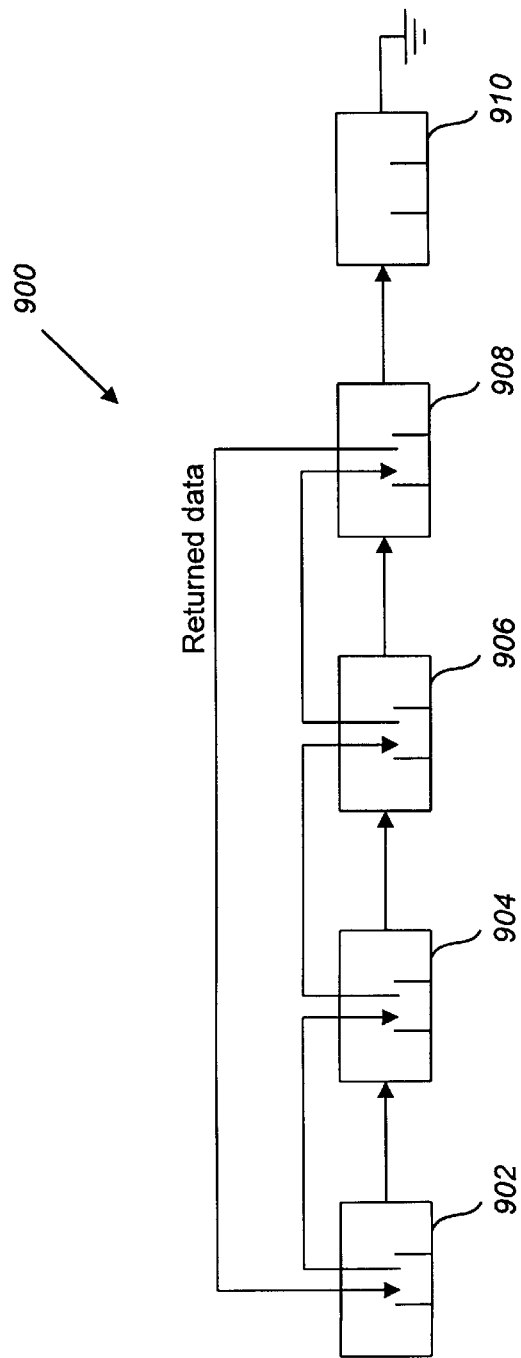
FIG. 9 depicts a bucket chain reordered in accordance with a second alternative embodiment of the present invention.

FIG. 9 depicts a second alternative embodiment that adopts a positionoriented approach to reorganizing a bucket chain 900, where records are relocated into entries having the same relative position within a bucket as the entry from where the record came. In the bucket chain 900 there are five buckets 902–910. In this example, the record returned to the caller was found in the second entry of bucket 908. After returning the record to the caller, the returned record is inserted into the second entry ("the second position") of the first bucket 902 and the record contained in the second position of each subsequent bucket is then pushed back into the second position of the following bucket until reaching the entry from where the returned data originally came. Using this position-oriented approach, reorganization processing is minimized after satisfying a data request, but the most recently used data is still inserted into the first bucket.

One skilled in the art will appreciate that other entry reorganization schemes can be used. For example, the most recently used data may only be moved forward a few buckets in the bucket chain, but a performance improvement would still occur.

Reducing Page Faults

Figure 10:
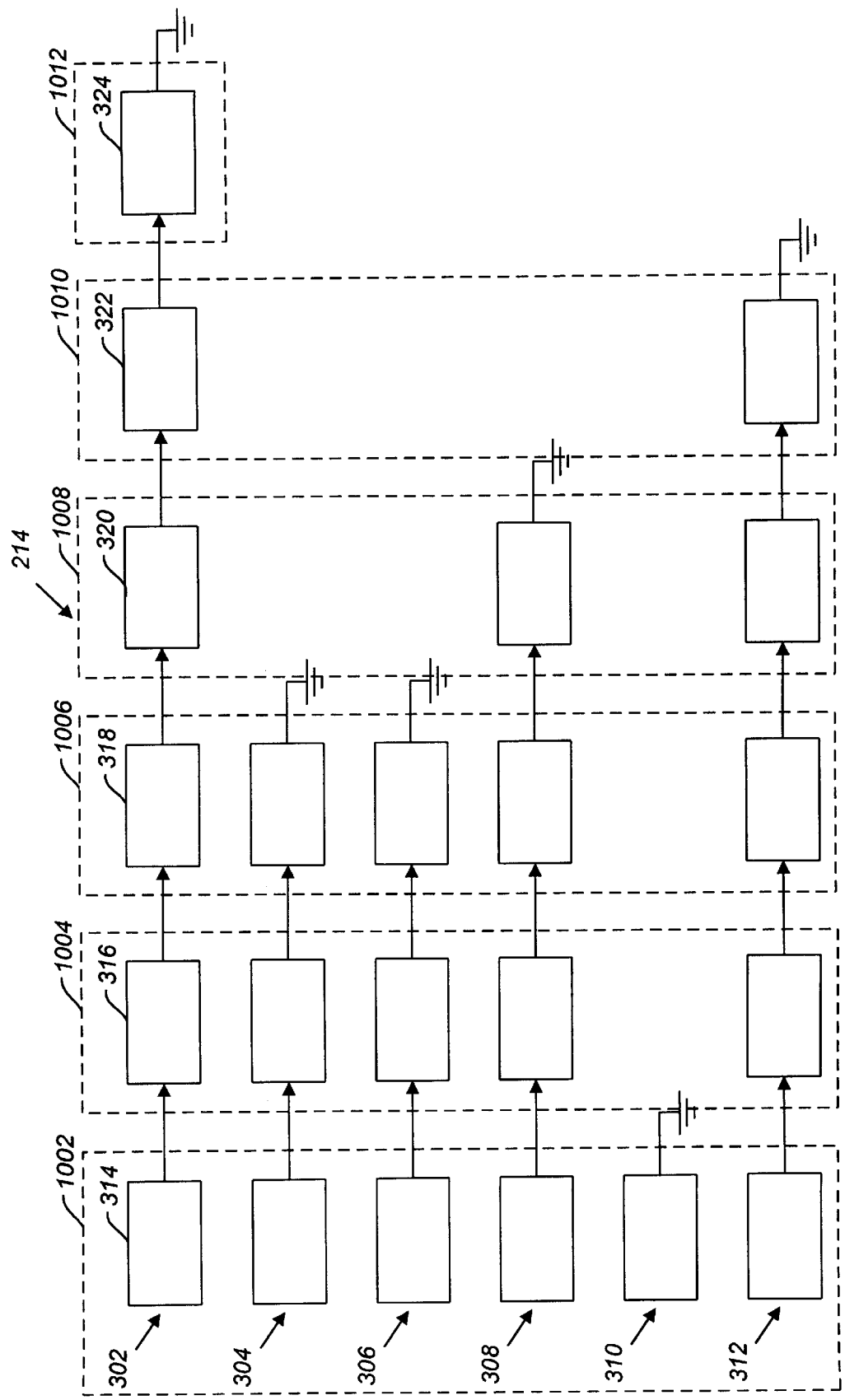
FIG. 10 depicts the buckets of FIG. 3 organized to fit within individual pages of memory.

One aspect of the present invention is directed to reducing the number of page faults that occur at runtime while the hash table is being utilized. FIG. 10 depicts a technique for storing the buckets of the hash table of FIG. 3 into a number of pages 1002–1012 so as to reduce the number of page faults that occur when accessing the hash table. Each group of buckets 1002–1012 are stored in a single block of memory (i.e., a page) so that all buckets within that page are swapped in and out of memory together. A typical page size is usually 4K to 16K. A page is allocated using a specific operating system service. Since the improved hashing system ensures that the most recently used records are stored in page 1002, which contains the first bucket of each chain, this page will typically always be resident in memory and very few page faults should occur with respect to this page. Similarly, the improved hashing system ensures that least recently used data is found in the buckets that are near The end of the chain. Therefore, since less frequently used data entries, such as those found in page 1008, are stored in a single page, this technique will minimize the number of times that this page is swapped into memory. One skilled in the art will appreciate that if a group of buckets (e.g., 1002) do not fit within a single page, they may be stored in one or more additional pages.

Figure 11:
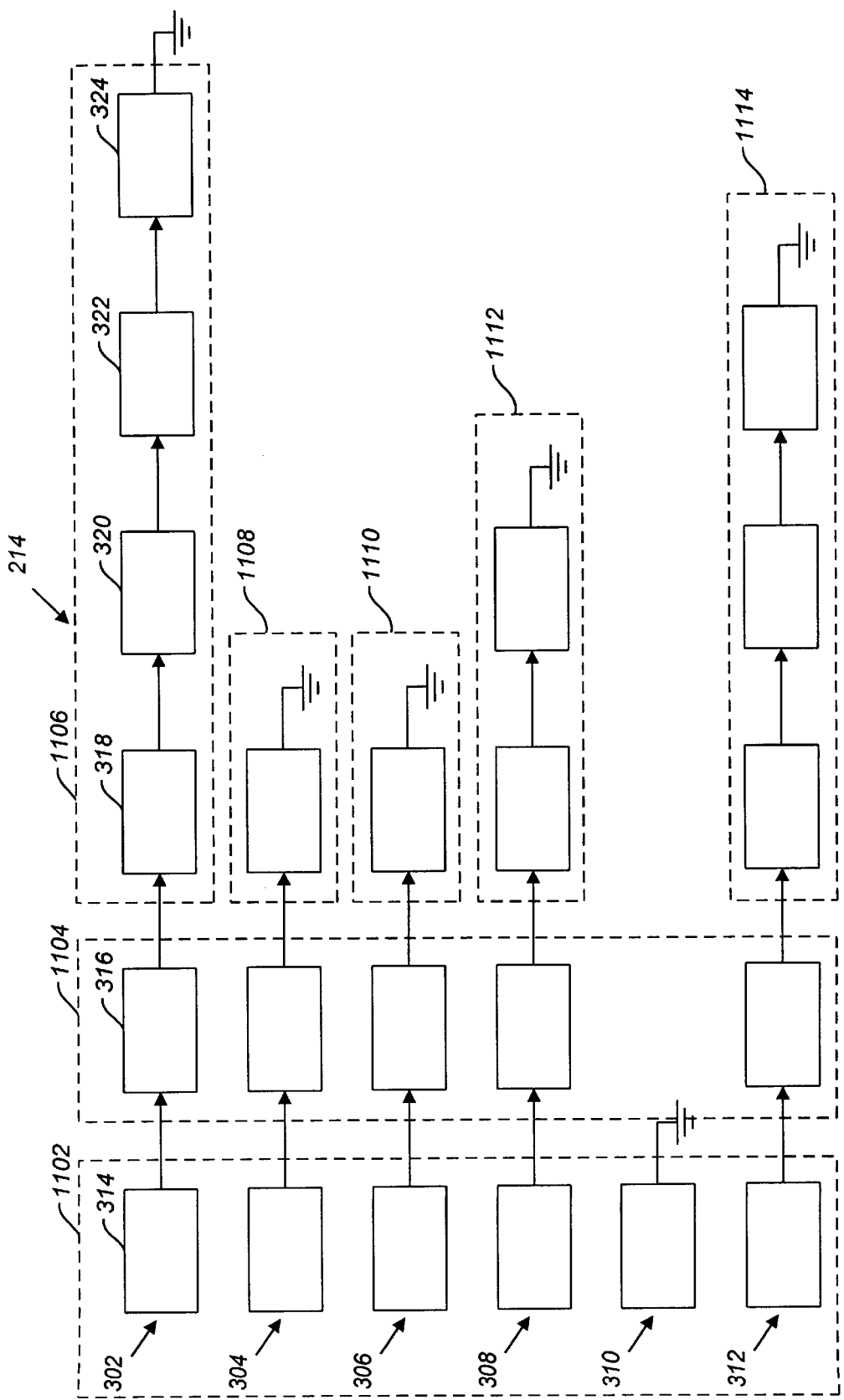
FIG. 11 depicts an alternative embodiment for organizing the buckets of FIG. 3 into individual pages of memory.

An alternative to the above grouping of buckets into individual pages is depicted in FIG. 11. In FIG. 11, only the first predetermined number (e.g, 2) of buckets in each chain are stored in the same page (e.g, pages 1102 and 1104). After the predetermined number of buckets are stored in the individual pages, the rest of the buckets in the chain (e.g., 318, 320, 322, 324) are all stored in a single page (e.g., 1106). This technique ensures that as the hashing mechanism scans the entries in the chain of buckets looking for a particular record, only one page fault occurs instead of a number of page faults. For example, if chain 302 were being scanned, when the hashing mechanism scans the entries in bucket 318, at worst, only one page fault would occur to complete the scanning of the entries for the rest of the chain of buckets. As such, the number of page faults is minimized.

In another alternative grouping of buckets into pages, more than one bucket may be stored in a page. For example, the first and second buckets of each chain may be stored into a single page. One skilled in the art will recognize that other bucket organizations can be used in accordance with the present invention.

While the present invention has been described with a preferred embodiment thereof, those skilled in the art will know of various changes in form and detail that may be made without departing from the spirit and scope of the present invention as defined in the appended claims.

We claim:

1. A method for reducing page faults in a computer system having a memory with pages, each page being a fixed number of bytes loaded into the memory as a block, the memory containing a hash table with chains of buckets storing data, the method comprising the steps of:

storing a first bucket of each chain into a first page; and storing a second bucket of each chain into a second page, so that when one of the stored first buckets is referenced but is not loaded in the memory, the first page is loaded into the memory as a block so that all of the stored first buckets are then loaded in the memory.

2. The method of claim 1, further including the step of:

for each chain,
storing the buckets that follow the second bucket into a same page.

3. A method for reducing page faults in a computer system having a memory with pages for accessing data, comprising the steps of:

creating a hash table having chains of buckets with each bucket having a plurality of entries storing the data, the buckets in each chain forming a sequence from a first bucket to a last bucket, each bucket having a position relative to the sequence; and storing the buckets of the chains having an equivalent relative position in the sequence into a single page of the memory.

4. The method of claim 2, further including the step of:

for each chain,
storing the buckets after a predetermined number of buckets into a single page of the memory.

5. A computer-readable memory device containing a hash table having chains of buckets forming a sequence from a first bucket to a last bucket, each bucket in each chain having a position relative to the chain, the memory device having pages each being a fixed number of bytes loaded into memory as a block, one of the pages of the memory device containing:

a bucket from each of the chains, wherein each of the buckets in the one page are at the same relative position within each of the chains.

6. A computer-readable medium containing instructions for controlling a computer system to reduce page faults, the computer system having a memory with pages for accessing data, each page being a fixed number of bytes loaded into the memory as a block, by:

creating a hash table having chains of buckets with each bucket having a plurality of entries storing the data, the buckets in each chain forming a sequence from a first bucket to a last bucket, each bucket having a position relative to sequence; and storing the buckets of the chains having an equivalent relative position in the sequence into a single page of the memory.

7. The computer-readable medium of claim 6, further including the step of:

for each chain,
storing the buckets after a predetermined number of buckets into a single page of the memory.

8. A computer system for reducing page faults, comprising:

a main memory with pages for storing at least a portion of a hash table having chains of buckets each storing data, the buckets in each chain forming a sequence from a first bucket to a last bucket, each bucket having a position relative to the sequence, the buckets of the chains having an equivalent relative position in the sequence stored in a single one of the pages, such that a bucket is currently stored in the main memory if the page storing the bucket is currently swapped into the main memory; and a secondary memory for storing portions of the hash table stored on main memory pages not currently swapped into the main memory, each main memory page indicating a unique fixed number of bytes stored on the secondary memory, so that when one of the buckets is referenced but is not stored in the main memory, the unique fixed number of bytes stored on the secondary memory that are indicated by the main memory page storing the one bucket and the other buckets at an equivalent relative position to the one bucket are loaded into the main memory.

9. The computer system of claim 8 further comprising:

a memory cache with cache lines having a cache line size, the buckets being a multiple of the cache line size, the memory cache storing a copy of at least some of the buckets stored in the main memory.

10. A computer-readable medium containing instructions for controlling a computer system to perform a method for reducing page faults in a computer system having a memory with pages for accessing data, the method comprising:

creating a hash table having chains of buckets with each bucket having a plurality of entries storing the data, the buckets in each chain forming a sequence from a first bucket to a last bucket, each bucket having a position releative to the sequence; and storing the buckets of the chains having an equivalent relative position in the sequence into a single page of the memory.

* * * * *